Oct. 8, 1929.  A. C. CHENOWETH  1,731,231
METHOD OF AND APPARATUS FOR SPREADING PLASTIC MATERIAL
Filed June 30, 1921   3 Sheets-Sheet 1

Inventor
Alexander Crawford Chenoweth
By his Attorney
Willis Bowler

Patented Oct. 8, 1929

1,731,231

UNITED STATES PATENT OFFICE

ALEXANDER CRAWFORD CHENOWETH, OF NEW YORK, N. Y.; CATHARINE R. CHENOWETH ADMINISTRATRIX OF SAID ALEXANDER CRAWFORD CHENOWETH, DECEASED

METHOD OF AND APPARATUS FOR SPREADING PLASTIC MATERIAL

Application filed June 30, 1921. Serial No. 481,470.

My invention relates to a method of and apparatus for placing or spreading a plastic material or aggregate on surfaces or places to be covered by the same, such for example, as installing a road or a foundation on a roadway by the use of ordinary concrete material. Some of the objects of my invention are to provide a portable travelling apparatus by means of which plastic material or aggregate may be quickly spread over a wide area, and in certain cases rolled and crowned; to provide a spreader which may be adjusted to make it longer or shorter to vary the area over which it operates to spread the material; to provide a movable spreader having a distributor for evenly distributing the material in the spreader; to provide a spreader which may be drawn over the surface on which it acts by a step-by-step movement, and to provide an apparatus which is self-contained by equipping it with a travelling mixing machine, a spreader and a charging device for the spreader operating between the two; and such an apparatus in which the mixer remains stationary while the spreader is operated by a step-by-step movement until its range of movement is completed, whereupon the mixer is then moved away from the spreader to space them and to repeat the operation. There are numerous other objects in view in my present invention which need not be herein recited, but which will be readily understood. My invention consists in the various novel and peculiar constructions and arrangements of the several different parts of the apparatus, as well as the various steps in the method, all as hereinafter fully set forth, and then pointed out in the claims.

I have illustrated a type of my invention, and by means of which my novel method may be carried out, in the accompanying drawings wherein.

Referring to the drawings, in which like numerals of reference designate like parts throughout, 1 indicates the ground or roadway which has been previously prepared or laid out for the formation of the road, and 2 are rails on tracks which are laid on the ground parallel with each other, longitudinally of the road and which serve as forms for gauging the width of the area over which the plastic material may be spread and which may also be used to gauge the thickness of the spread material, at the edges, and at the same time are used as track rails for parts of the apparatus to travel on, as hereinbefore described. A self-propelling mixer 3 for concrete or plastic material, of an ordinary well-known type, is arranged to travel on its ground wheels 4 on the ground 1 between the form members 2. This mixer has the usual mixing drum 5 suitably driven from an engine 6 and it has a vertically swinging charging device 7 for charging the drum, and the mixed material is discharged from the drum 5 in prepared condition through the discharge-chute 8, in the ordinary way. The mixer is provided with the usual swinging boom 9, having its inner end provided with a hinge joint 10, on which the boom may be swung up and down and suitable gearing 11, is provided by which the boom may be swung to and fro sidewise. A conveyor bucket 12 is mounted to travel on trolley 13 longitudinally of the boom so that it may be brought close to the mixer and receive therefrom the prepared mixed material from the chute 8, and a cable 14 is connected with the bucket mechanism and passes over a guide-pulley 15, at the end of the boom; thence over a guide pulley 16 on the upper structure of the mixer and around another guide pulley 17, and thence to a power driven operating device, which is not shown, and by means of which the bucket is drawn along the boom outwardly from the mixer. Another cable 18 is connected between the bucket mechanism and the driving means on the mixer for the purpose of pulling the bucket inwardly on the boom, in a manner well known. The boom is raised and lowered vertically by means of a cable 19 which is attached to the outer end of the boom and passes over a guide pulley 20 on the upper part of the mixer, thence down to a drum 21 on a transversely arranged drive shaft 59, which will be hereinafter described, and an ordinary clutch mechanism 23 is provided on the shaft 22 for the purpose of coupling the shaft with the drum 21 and uncoupling it.

Figures 1, 2:
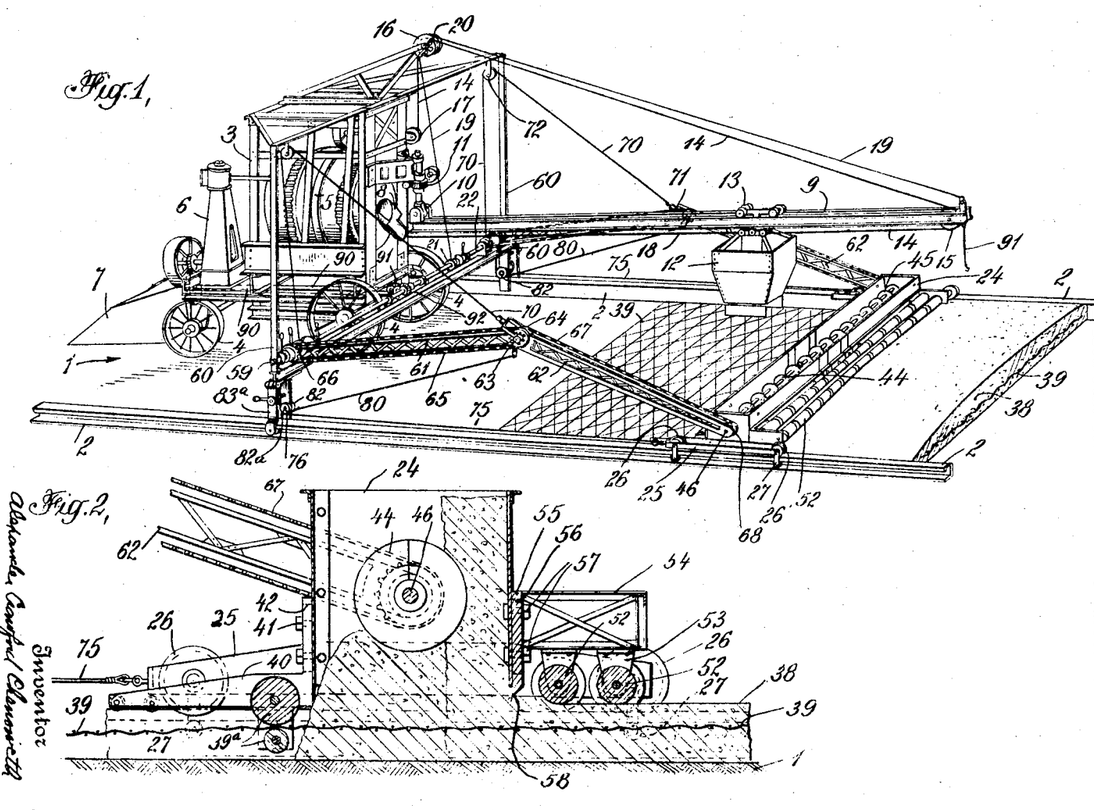
Fig. 1 is a perspective view, somewhat diagrammatic, of apparatus embodying my improvements.
Fig. 2 is an enlarged view of a cross section on a vertical plane of the spreader placed in position on the roadway with a portion of spread material containing a reinforce and a quantity of the plastic material within the spreader.

My improved spreader is here shown in the form of a movable rectangular frame or box 24, open at the top and bottom, which extends transversely of the path over which it is moved and which is provided at each end with a truck 25, having upper and lower wheels 26, 27, which engage respectively the upper and inner parts of the channel-shaped rail 2, as indicated more clearly in Fig. 2. The spreader box is made in sections with a set of removable sections 28, 29 and 30, arranged in the center of the length of the box, these sections being removably held in place by means of detachable fastening means including plates 31 and bolts 32. One or more of the sections may be removed or inserted as the case may be to shorten or lengthen the length of the spreader box.

Figure 6:
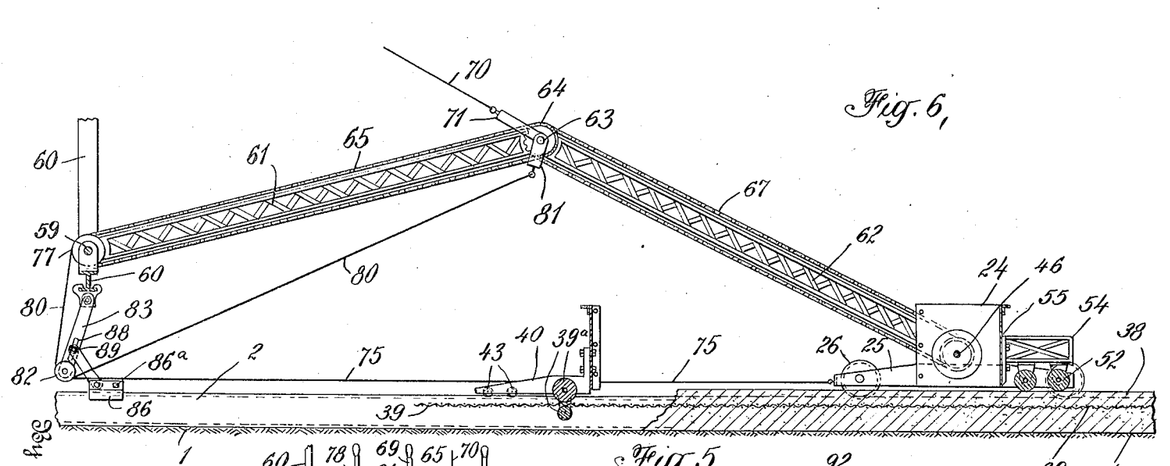
Fig. 6 is an enlarged side view of the spreader device with the means for moving it towards and away from the mixer and showing how it may be reciprocated in order to roll down and finish the surface of the newly laid section of the material, and during which operation the horizontal guide-rollers for the reinforce are disengaged from the spreader and moved out of range of the reciprocating movement thereof, as shown in this view at the central lower part of the figure.

Upon the outside of the spreader box 24, are mounted a set of rollers 33, for surfacing and smoothing the material, the rollers being in sections, and mounted in bearings 34, carried by brackets 35, which are detachably and adjustably connected by bolts 36, to the side of the box 24. The brackets 35 are formed with vertical slots 37, shown in dotted lines in Fig. 4, for receiving the bolts 36 and thereby permitting vertical adjustment of the rollers to vary their distance above the ground in order to accommodate different thickness of the layer of material 38. In some cases the aggregate material is reinforced by incorporating in the layer of spread material, a sheet of wire gauze 39, which is substantially of the width of the layer of material and is placed in position between the spreader and mixer and is passed between suitable guide rolls $39^a$, which are mounted to turn freely on brackets 40, 40, which are secured removably to the side of the spreader box by means of bolts 41, which pass through vertical slot 42, in each bracket and permit vertical adjustment thereof so as to adjust the guide-rolls at the proper level, as shown more particularly in Fig. 2, and in order to feed the wire mesh 39 into the desired position in the plastic material as it is deposited by the spreader. The brackets 40 at the respective ends of the spreader and which carry the guide-rolls $39^a$ are provided with wheels 43, which run on the rails 2. The brackets 40, together with the guide-rolls $39^a$, are detached from the spreader and moved away from the same, as shown in Fig. 6, when the spreader is to be reciprocated in the maner hereinafter described for the purpose of smoothing the surface of the spread material.

Figures 3, 4, 7:
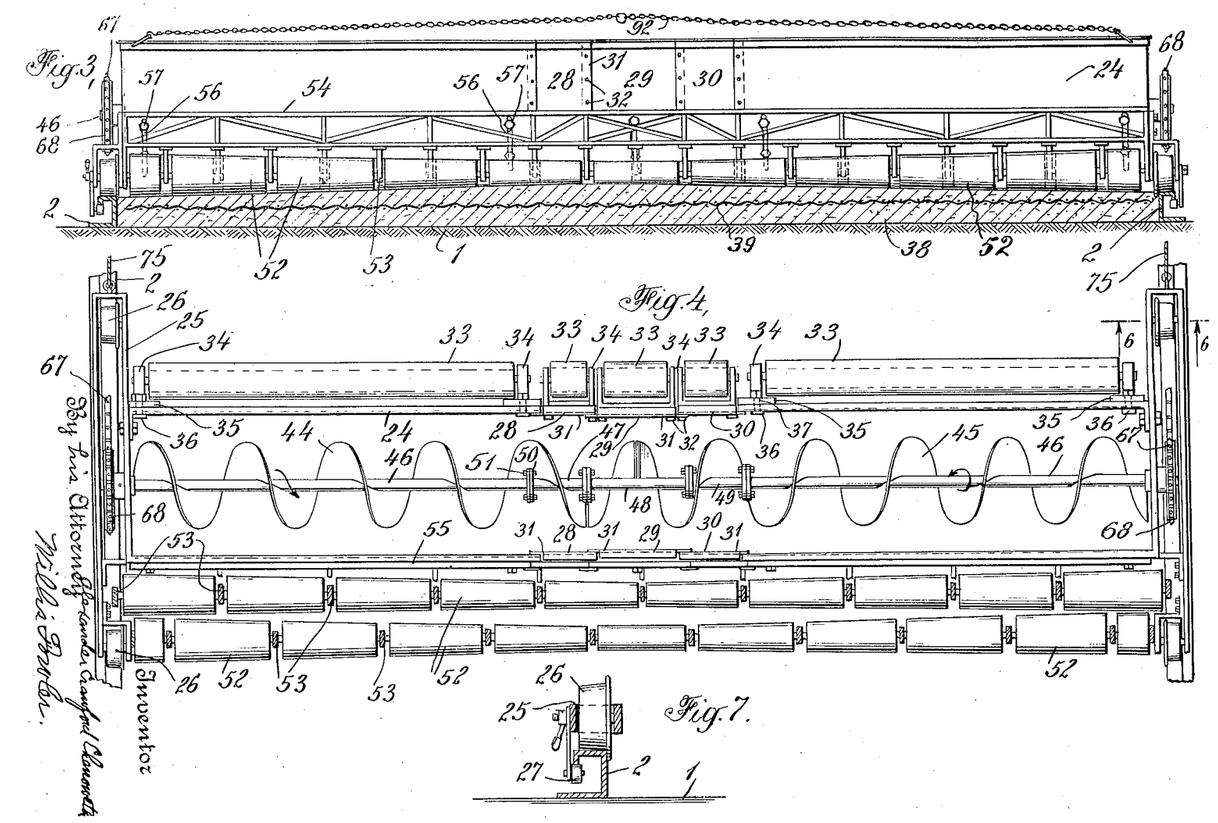
Fig. 3 is a front view of the spreader with the subjacent layer of reinforced spread material and the roadway shown in section.
Fig. 4 is a top view of the spreader with the wire mesh reinforce feed or guide rollers shown in the upper part of the view and the sectional and tapering crowning rollers shown in the lower part of view.
Fig. 7 is an enlarged detail view of a portion of the truck of the spreader, showing how it engaged with the rail.

A distributor is located within the spreader box 24 for the purpose of distributing, in substantially a uniform manner, the plastic material or aggregate when the same is dumped at the center of the box and in the present construction I show such a distirbutor in the form of a screw or worm conveyor 44—45, the part 44 being pitched in one direction from the central point of the screw and the part 45 pitched in a reverse direction; so that each part will push the material toward the adjacent end of the spreader. The screw is operated by means of a shaft 46 which extends through the spreader box and is provided with suitable bearings at the end of the box. This conveyor worm and its shaft are formed in sections so that it can be made of greater or less length when the length of the spreader box is varied as hereinbefore described, and I show three removable sections of the shaft and worm at the center thereof, as indicated at 47, 48 and 49, these detachable sections being provided with clamping plates and bolts 50 and 51, as indicated in Fig. 4. The distributor shaft 46 is driven by means of connections hereinafter described.

Upon the other side of the spreader box 24 from that carrying the smoothing rolls 33, I mount two rows of tapered sectional rollers 52, the large ends of the rollers pointing outwardly towards the ends of the box; the rollers being thus tapered to give an arched or crown effect to the material 38, as shown in Figs. 1 and 2. These crowning rollers 52, in addition to shaping the material, also serve to smooth it, and these two sets of rollers are carried by series of hangers 53 which depend from a framework 54 which is made up of suitable braces and struts and is attached to the side of the spreader box 24 by means of a plate 55 formed with vertical slots 56 through which pass bolts 57, and by means of which the frame may be adjusted vertically on the side of the box in order to vary the distance of the crown rollers from the surface on which the material is spread and to thereby regulate the thickness of the layer of material. Each set of the rollers 52 is mounted on the shaft 52$^a$ which extends from one end to the other and when the length of the box is to be shortened by removing the section from the center thereof as hereinbefore described one or more rollers of each set may be removed and a shorter shaft 52$^a$ substituted.

The lower edge of the plate 55 which carries the hanger frame 54 is provided with a scraping edge 58, as shown in Fig. 2 for the purpose of acting on the material as it is deposited from the spreader box by the movement of the same and this plate serves as a crowning or shaping device. The crowning rollers 52, together with the supporting frame 54 and the crowning plate 55 may be together removed from the spreader box whenever desired by releasing the bolts 57.

The spreader box 24, together with the distributor 44—45 is constructed and arranged so that it may be moved at will on the tracks 2 and in so doing to gradually deposit the contents of the box.

The distributor of the spreader device is actuated by means of connections with the driving mechanism on the mixer and this may be accomplished in different ways, the manner of so doing being here shown as follows: A transverse horizontal drive shaft 59 is mounted in suitable bearings in a frame 60 which is rigidly secured in any suitable manner to the frame of the mixer. Between the respective ends of the drive shaft 59 and the ends of the distributor shaft 46 in the spreader box, I mount a pair of toggle or knee joints which comprises trussed members 61—62 the meeting ends of which members are pivoted on a shaft 63 which carries a pair of chain wheels 64 fixed thereto and one of which chain wheels 64 is driven by a chain 65 passing over a toothed wheel 66 mounted on a drive shaft 59, while a second drive chain 67 passes over the other chain wheel 64 and along the member 62 where it passes around a chain wheel 68 which is fixed to the worm shaft 46, on which shaft is pivotally mounted the toggle member 62, so that the two toggle members have three pivoted joints, to wit, that on the drive shaft 59, the central joints 63 and the spreader box shaft joint 46, and by raising and lowering the central joint 63 the spreader box may be reciprocated on the forms 2.

The drive chain 65 receives its motion from the toothed wheel 66 which is controlled by a hand operated clutch 69 so that it may partake of the motion of the drive shaft 59 or remain idle as desired. When it is desired to operate the distributor worm the clutch 69 is adjusted so that the shaft 59 by means of the toothed wheel drives the chain 65 which actuates the chain wheels 64 at the middle joint of the toggle and this serves to drive the chain 67 thereby operating the wheel 68 and the shaft 46.

These toggle or knee joints and the drive chains and other connecting mechanism are duplicated on opposite sides of the machine, as indicated in the drawing.

When in the operation of the apparatus, the spreader box is filled with concrete or aggregate material through means of the conveyor bucket 12 the distributor worm 44—45 is then operated in the manner already described by means of the drive chains and at the same time the spreader is slowly drawn toward the mixer to cause the same to spread the concerete on the prepared way. After the spreader is moved such a distance as to distribute substantially all of its contents this movement ceases and then it is refilled in the way described. After it is thus refilled with concrete it is again moved toward the mixer until its contents have been distributed and this step-by-step motion is repeated at intervals and until the spreader is drawn so close to the mixer that the two devices have to be spaced apart and this is done by then moving the mixer forward the entire distance which the spreader covers in its step-by-step movements.

The step-by-step movement of the spreader is here shown as being accomplished by pulling upwardly on the central joints of the toggles or knee joints, by means of a cable 70 which is attached to a yoke 71, the ends of which are pivoted to the respective ends of shaft 63 of the central joint of the knee. The cable 70 passes upwardly over a guide pulley 72, thence outwardly around a drum 73 on the drive shaft 59 which drum is controlled by a hand operated clutch 74 so that when the clutch is closed the drum will pull upon the cable 70, and when the clutch is open the drum will be motionless. In addition to this upward pull on the knee joint I also provide a direct horizontal pull on the spreader device itself by means of another cable 75 which is attached to the spreader device and runs towards the mixer and passes around a guide pulley 76 upwardly and around a drum 77 on the drive shaft 59, which drum is controlled by a hand operated clutch 78 so that this drum may be made to turn with the shaft 59 to wind the cable 75 or to remain idle as desired.

The direct pull on the spreader by the cable 75 and the upward pull on the knee joint by the cable 70 occur simultaneously so that ample power may be called into play to move the spreader device with its load, and this movement continues until the spreader is practically emptied of its contents. The spreader is then again recharged by means of the travelling bucket 12 depositing the material at the center of the spreader box and the distributor worm moving the material thus deposited toward each end of the box to level the contents therein. The distributor worm may then be brought to rest, and the movement of the spreader towards the mixer is then resumed and continued until the new charge in the spreader has been exhausted. When a reinforce in the form of wire mesh is used, I take a sheet of the wire gauze 39 and place it in position between the forms 2 and pass the forward end of the sheet between the guide-rolls 39$^a$ which are adjusted vertically so as to give the proper elevation of the reinforce above the ground to properly position it in the layer of material, as indicated in the drawings. It is preferable to introduce the wire gauze in sheets where the gauge of the wire is large, otherwise the wire gauze may be fed from a supply roll suitably arranged in respect to the spreader.

As it is desirable to smooth and finish the surface of the spread concrete or aggregate, this may be readily done by means of my apparatus by first detaching therefrom the guide-rolls 39$^a$ which guide the sheet of reinforce material and moving the guide-rolls a slight distance away from the spreader, as indicated for example in Fig. 6, and then reciprocating the spreader with its rollers so that they move back and forth over the surface of the material and make it smooth. This reciprocation of the spreader with its rollers is effected from the driving motor of the mixer through means of the cables 70 and 75 which pull respectively on the knee joint of the toggle and on the spreader box and cause the same to be moved inwardly toward the mixer. The outward movement of the reciprocating movement of the spreader is effected by means of a cable 80 arranged one in each side of the apparatus and connected to a yoke or bracket 81 which is swung on a shaft 63 of the knee joint. This cable 80 passes around a guide pulley 82 which is fixed on braces 83 which is placed between the framework 60 and the track 2. The cable 80 passes from the guide-pulley 82 upwardly to a drum 84 which is mounted on the drive shaft 59 and is controlled by the hand operated clutch 78 so that when the clutch is closed in respect to the drum the latter will wind on the cable 80 and thereby pull down upon the knee joint of the toggle and this serves to push the spreader outwardly from the mixer. This clutch 78 operates in conjunction with the two adjacent windings on drums 77 and 84 and in normal position stands out of engagement with both of the drums. When the winding drum 84 is thus pulling on the cable 80 the drums 73 and 77, which control the cables 70 and 75 respectively are both idle so that these cables will be slack and may be easily drawn outwardly by the outward movement of the spreader. By repeating the operation of raising the knee joint and lowering it in the manner described, the spreader, with its attached rollers may be reciprocated as many times as desired in order to complete the smoothing and finishing operation on the surface of the concrete or aggregate material, and this is an important feature of my present invention.

Figures 5, 8:
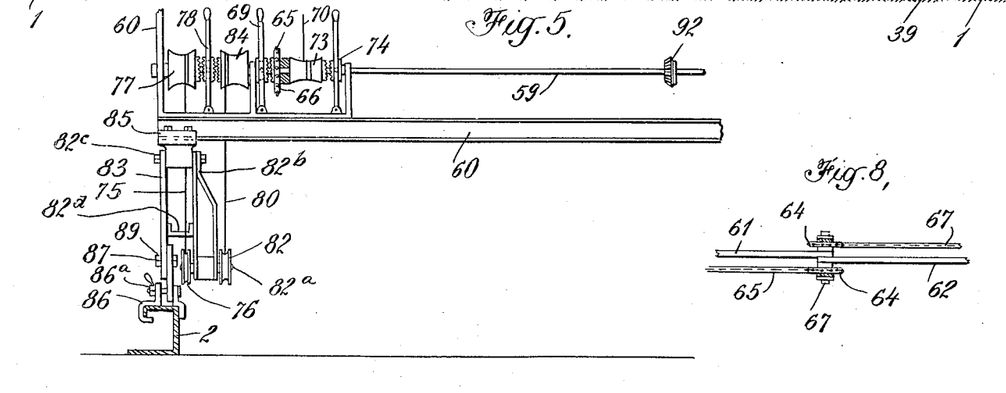
Fig. 5 is an enlarged detail view of part of the mechanism showing the cable-drums and clutches for operating the spreader-moving means, as hereinafter described.
Fig. 8 is a detail view of part of the toggle joint.

In order to give the necessary stability to the framework 60, on which the drive shaft 59 is mounted, I arrange a brace 83 at each end of the frame 60, and connect them between the said frame and the track 2, as shown more clearly in Figs. 5 and 6. The brace 83 is provided at its upper end with a sliding clamp 85 which engages the lower flange of the I-beam on the under side of the frame 60 so that it may be adjusted along the length of the beam in order to accommodate different widths of the road. The lower end of the brace is provided with a clamp 86 for engagement with the rail 2 and this clamp may be released in order to slide it along the rail when the mixer is to be moved. The brace 83 is made so that it can be lengthened or shortened by means of a joint 87 comprising slot 88 in the upper member of the brace, and a bolt 89 in the lower member (see Figs. 5 and 6), in order to adjust the parts to any variation in the distance between the frame 60, and the forms 2, the latter elements being varied in height according to the thickness of the layer of concrete to be laid. The two cable guide-pulleys 76 and 82, hereinbefore described, are mounted upon a shaft 82$^a$, carried by a depending bracket 82$^b$ the upper end of which is attached to a releasable bolt 82$^c$, on the slide 85, and to which bolt the upper end of the brace 83 is movably attached so that they may both be swung thereon, the two parts being united by a fixed member 82$^d$. The brace or support 83$^a$ shown in Fig. 1, for supporting the frame 60, on the tracks 2, lacks the adjustable feature of part described in connection with Figs. 5 and 6.

The drive shaft 59 may be driven in any suitable manner from the engine 6 on the mixer. In the present construction, I show a horizontal shaft 90 indicated partly in dotted lines in Fig. 1, as running from the engine 6 rearwardly to a point near the drive shaft 59 where the shaft 90 is provided with a bevel gear 91 which meshes with another bevel gear 92 fixed on the shaft 59 (see Figs. 1 and 5).

By this means the transverse drive shaft 59 is driven from the engine 6 of the mixer and the shaft may be actuated at will intermittently when desired, or it may be permitted to run continuously and the various clutches thereon operated to call into action the different parts controlled by these clutches.

In cases where it is desirable to disconnect the spreader and to remove it, this may be readily done by detaching the members 62 of the knee joints from the worm shaft 46 and disengaging the trucks of the spreader from the rails, and then connecting the hook 91 which is mounted on the outer end of the boom 9, with the central ring of the chain tackle 92 which may be connected up with the spreader box, as shown in Fig. 3. By means of the engine on the mixer the boom may be then raised so as to lift the spreader and swing it to either side and deposit it out of the way. The outer member 62 of the knee joints may then be folded back on the inner members 61 and secured in a vertical position against the framework of the mixer. Then the mixer, with its boom and conveyor bucket, may be operated in the ordinary way.

It will be observed that my improved spreader, either with or without the rollers connected therewith, may be operated in conjunction with any suitable road constructing or finishing machinery and that when used with the rollers the spreader may be suitably reciprocated over the spread material so as to smooth and finish the surface of the same. Likewise the reinforce supporting or guiding means for properly locating it in the layer of spread material, may be used in conjunction with a spreader when the same is applied to any of the well known types of road making or finishing apparatus.

From the foregoing description the operation of my improved apparatus will be readily understood. The way 1 having been suitably prepared for a road, the forms 2 are laid parallel with each other at a distance apart which is equal to the width of the concrete or aggregate material which is to be laid on the way. These forms 2 also serve as rails or tracks on which the wheels of the spreader move likewise and to which the framework of the mixer may be slidingly attached. An ordinary concrete mixing machine 3 which is provided with the usual motor for driving the mechanism of the mixer and also for propelling the machine on the ground, is arranged on the way between the forms 2, and the spreader which is connected with the mixer by means of the toggle or knee joints is placed at its furthest point of movement from the mixer and then the concrete or aggregate material is conveyed from the mixer by the conveyor bucket and dumped in the center of the spreader at which time the distributor worm is operated in the spreader to carry the mixture from the center of the spreader toward each end and evenly distribute it. This supplying of the spreader with the material continues until the spreader box is substantially filled to the top whereupon the supply is stopped and the motion of the distributor ceases. Then the operator proceeds to draw the spreader slowly in towards the mixer and the spreader proceeds to deposit the layer of concrete of a certain predetermined thickness depending upon the height of the forms at each side of the way and the distance of the spreader above the way. As the spreader is gradually drawn towards the mixer the concrete is deposited by the spreader in a manner indicated substantially in Fig. 2 and as the spreader moves on, the shaper or crowning plate and the rollers which follow along serve to level the deposited material after it has left the spreader and to roll it down and make it compact in a uniform layer or body and to smooth the surface thereof, as indicated in the drawing. In cases where the layer of deposited material is to be reinforced by an ordinary reinforce means such as a sheet of wire gauze, this material is introduced by means of suitable guide rollers or means placed at the desired level above the way and removably attached to the spreader and by means of which the reinforce wire mesh in introduced into the body of the spread material and across its entire width. When the spreader has been practically emptied of its contents its inward movement is stopped and it remains at rest until the operation of refilling the spreader with the concrete has been completed in the manner hereinbefore described. When refilled the spreader is then gradually moved again toward the mixer as previously described and this step-by-step movement of the spreader toward the mixer is continued at each refilling of the spreader and until it has been moved practically over its entire range of movement toward the mixer, whereupon the spreader is then held at rest and the mixer is moved forwardly the entire distance of the range of movement which the spreader has covered by its step-by-step periodic movement, so that the mixing machine, with its attached framework and various adjuncts, is not of itself moved during the operation of spreading the concrete and it is only moved at comparatively long intervals and when the spreader has, by its step-by-step movements, been moved over its entire range of movement.

In order to finish and smooth the upper surface of the concrete or aggregate material after it has been laid by the spreader and crowned, before refilling the spreader, I proceed to reciprocate the same moving it back and forth on the rails by moving the knee joints up and down and continue to do this until the surface of the concrete has been thoroughly rubbed and rolled into finished condition. If preferred, however, the smoothing and finishing of the surface of the concrete layer may be deferred until the spreader is moved over its entire range of movement in its step-by-step action, at which time the spreader may be then reciprocated by short or long strokes over the spread concrete in order to properly finish it. In reciprocating the spreader to finish the surface of the laid material, I detach from the spreader the supporting or guiding means of the reinforce material, as indicated in Fig. 6, in order not to encumber the operation of the mechanism.

It will be observed that the feature of the smoothing and finishing rollers with the capacity of being reciprocated over the laid material in order to finish the upper surface thereof, may be used in conjunction with any well known forms of road making machine, and that likewise the spreader may be used in such connection.

Having thus described my invention, what I claim and desire to secure by Letters Patent is:

1. In material-laying apparatus of the type in which a power-driven mixer is provided with a horizontally extending boom along which a batch-carrying bucket is moved to and fro between the mixer and a discharging point, a spreading device arranged to receive material discharged from the bucket and independent thereof, and means for utilizing power supplied from the mixer to pull the spreader towards the mixer to thereby spread the material in a progressive layer upon the surface to be covered.

2. In material-laying apparatus of the type in which a power-driven mixer is provided with an outwardly extending boom along which a batch-carrying bucket is moved to and fro between the mixer and a discharging point, an elongated spreading device extending transversely of the direction of projection of said boom and arranged to have material deposited therein by said bucket, and means connecting the spreading device to the mixer and operated by power supplied from the mixer to draw the spreading device toward the mixer to thereby spread the material.

3. In material-laying apparatus of the type in which a power-driven mixer is provided with an outwardly extending boom along which a batch-carrying bucket is moved to and fro between the mixer and a discharging point, a spreading-device supported by the surface to be covered and extending transversely of the direction of projection of said boom, said spreading device being arranged to have material deposited therein by said bucket, means connecting the opposite ends of the spreading device to the mixer, and means for applying power supplied by the mixer to the connecting means to pull the spreading device toward the mixer and thereby spread and form the surface of the mass of material.

4. An attachment for material-laying apparatus of the type in which a power-driven mixer is provided with an outwardly projecting boom along which a batch-carrying bucket is moved to and fro between the mixer and a discharging point, consisting of a spreading device supported by the surface to be covered and extending transversely of the direction of projection of said boom, said spreading device being arranged to have material deposited therein by said bucket, means connecting the opposite ends of the spreading device to the mixer, and means for applying power supplied by the mixer to the connecting means to pull the spreading device toward the mixer and thereby spread and form the surface of the mass of material.

5. Apparatus for laying plastic material, comprising a travelling spreader provided with smoothing means acting upon the spread material, means for distributing the material supplied to the spreader, said distributing means being located within said spreader and acting positively on the material at a low point therein, power-driven means for moving said spreader to cause it to spread its contents on the surface to be covered, and means for reciprocating said spreader longitudinally over the spread material in contact therewith.

6. Apparatus for laying plastic material, comprising a spreader sustained in contact with the spread material and provided with forming rollers constructed and arranged to act upon the surface of the spread material, power-driven means for drawing the spreader over the work-bed in its spreading operation and longitudinally reciprocating it to actuate the rollers in the forming operation.

7. Apparatus for laying plastic material, comprising a movable spreader arranged with its discharge mouth about the level of the surface of the spread material, a travelling material mixer for supplying material to the spreader, said spreader and mixer being movably connected together for the independent travelling movement of each, means for moving the spreader each time it is filled with material to spread the same, said movement of the spreader being independent of the mixer and said spreader operating with a spreading action upon said material.

8. Apparatus for laying plastic material, comprising a travelling spreader arranged with its discharge mouth about level with the surface of the spread material, a travelling material mixer, said spreader and mixer being movably connected together, a conveyor for supplying the material from the mixer to the spreader, and means for moving the spreader towards the mixer until substantially emptied, said spreader and mixer being relatively movable with respect to each other, and said spreader acting with a spreading action upon said material.

9. Apparatus for laying plastic material, comprising a travelling spreader, a travelling material mixer and a conveyor for supplying the material from the mixer to the spreader, and means for moving the spreader with its contents towards the mixer until substantially emptied, said mixer and spreader being constructed and arranged to be moved independently of each other whereby the spreader may be moved step by step while the mixer remains at rest and the mixer may be moved away from the spreader while the latter remains at rest, said spreader being arranged to discharge its contents upon the work-bed at substantially the level of the spread layer, and to operate thereon with a positive spreading action.

10. Apparatus for laying plastic material, comprising a travelling spreader provided with a power-driven distributor and having a width coextensive with that of the laid material, a travelling mixer provided with means for driving the mechanism thereof, said mixer and spreader being movably connected together, connections between the driving means of the mixer and the distributor of the spreader for actuating the latter, the said spreader and mixer being relatively movable with respect to each other and said spreader acting with a spreading action upon said material.

11. Apparatus for laying plastic material, comprising a movable spreader about equal in width to that of the spread material, said spreader being constructed and arranged to deposit its contents gradually on the work bed in layer form, a travelling mixer provided with means for driving the mechanism thereof, connections between said spreader and the said driving means of the mixer for moving the spreader part way towards the mixer when the spreader is filled with material, said spreader and mixer being capable of relative movement over the surface on which the material is spread each independently of the other, and said spreader operating with a spreading action upon said material and being rigidly held against upward movement during the spreading action.

12. Apparatus for laying plastic material, comprising a movable spreader provided with a distributor disposed within said spreader, a travelling mixer having means for driving the mechanism thereof, connections between said driving means of the mixer and said distributor and also said spreader whereby said driving means of the mixer serves to actuate at will said distributor and said spreader.

13. Apparatus for laying plastic material, comprising a movable spreader, a travelling mixer having means for driving its mechanism, pivoted connections between said spreader and mixer, and connections between the driving means of said mixer and said pivoted connections whereby said connections may be operated at will to draw the spreader step-by-step towards the mixer.

14. Apparatus for laying plastic material, comprising a movable spreader, a travelling mixer having means for driving the mechanism thereof, toggle or knee joints connected between said mixer and spreader, connections between said knee or toggle joints and the driving means of said mixer for actuating said joints to move the spreader.

15. Apparatus for laying plastic material, comprising a movable spreader, a travelling mixer having means for driving the mechanism thereof, toggle or knee joints connected between said mixer and spreader, connections between said knee or toggle joints and the driving means of said mixer for actuating said joints to move the spreader, and connections between said spreader and the driving means of said mixer for moving said spreader simultaneously with the movement of said toggle joints.

16. Apparatus for laying plastic material, comprising a movable spreader provided with a distributor, a travelling material mixer having means for driving the mechanism thereof, toggle joints connected between said mixer and spreader and drive chains mounted on said toggle joints and connected between said spreader and driven means on said mixer for actuating at will said distributor.

17. Apparatus for laying plastic material, comprising a travelling material mixer having means for driving the mechanism thereof, a movable spreader provided with a distributor, a travelling conveyor operating between said mixer and spreader and connections between said conveyor and the driving means of said mixer for operating the conveyor.

18. Apparatus for laying plastic material, comprising tracks, a movable spreader travelling on said tracks and retained in movable connection therewith to prevent vertical separation, means for supplying the material to said spreader and means for moving said spreader on the tracks to distribute its contents therebetween.

19. Apparatus for laying plastic material, comprising a reciprocating spreader and means for reciprocating it, means for supplying plastic material to said spreader, forming rolls connected with said spreader for acting upon the surface of the spread material, and vertically adjustable guide-rolls for engaging reinforcing material and introducing it into the layer of material deposited by the spreader.

20. In apparatus for spreading plastic material, a power driven mixer for supplying the material, a spreader movable with respect to said mixer and movably connected therewith and of a width equal to that of the spread material, said driving means of the mixer being connected with and causing the movement of said spreader independently of said mixer.

21. In apparatus for spreading plastic material, a mixer for supplying the material and provided with means for driving it, a movable spreader and pivoted connections between the same and said mixer and having a width coextensive with that of the spread material, the said driving means of the mixer also serving to move the said spreader with respect to the mixer and independently thereof.

22. In apparatus for spreading plastic material, a mixer for supplying the material and provided with means for driving it, a movable spreader and pivoted connections between the same and said mixer, said spreader being moved by the driving means of said mixer and independently thereof, a movable distributor in said spreader and connections between the same and the driving means of the mixer for actuating the distributor, said spreader having a width substantially equal to that of the spread material.

23. In apparatus for spreading plastic material, a mixer for supplying the material and provided with means for actuating it, a movable spreader provided with finishing means for the spread material, and connections between the actuating means of the mixer and said spreader for reciprocating the latter longitudinally over the spread material to finish it.

24. In apparatus for spreading plastic material, a power-driven mixer, rails parallel with the line in which said mixer travels and connections between the mixer and rails to prevent accidental disengagement, a spreader supplied with mixed material from said mixer and travelling on said rails and actuated by the power from said mixer and having connections with said rails permitting travel thereon but preventing vertical separation, said spreader being operatively connected with said mixer and adapted to be drawn toward the same while the mixer remains at rest.

25. In apparatus for spreading plastic material, a power-driven mixer, a travelling spreader actuated by the power from the mixer and adapted to be reciprocated thereby, rollers mounted on said spreader for acting upon the surface of the spread material, demountable guide-rolls for engaging and introducing sheet reinforce material into the plastic material as it is deposited and spread by the spreader, whereby said rolls may be detached when the spreader is to be reciprocated.

26. The herein described method of constructing concrete roads by spreading plastic material directly upon the surface to be covered, which consists in supplying the plastic material from a mixer adapted to travel along the roadway and conveying the material from the mixer to crosswise distributing means at a distant point where it is to be applied and distributing it crosswise on said surface, then spreading the crosswise-distributed material longitudinally directly on said surface towards said mixer while it remain at rest, then advancing said mixer along the roadway to space it from the distributing means and repeating the aforesaid steps.

27. In apparatus for spreading plastic material directly upon the surface to be covered, a traveling power-driven material mixer, charging means movable to and fro for receiving the material from said mixer and discharging it at a distance therefrom, a spreader movable over said surface in contact therewith and receiving the material from said charging means, said spreader being moved gradually towards said mixer by means of its driving-power to cause the spreader to progressively discharge and spread its contents directly on said surface with a positive spreading action.

28. In apparatus for laying plastic material, tracks and a movable spreader traveling on said tracks, a traveling material mixer provided with driving means and having means for loosely engaging said tracks and securing it thereto to prevent accidental displacement, hinged connections between said spreader and mixer permitting independent movement of each, and means for supplying material from the mixer to the spreader.

29. In apparatus for laying plastic material, a traveling mixer provided with means for actuating it to mix the material, a reciprocating spreader connected with said mixer so that each may be moved with respect to the other and said spreader being reciprocated longitudinally over the spread material by the actuating means of the mixer, and means for supplying the material from the mixer to the spreader, and finishing rolls connected with said spreader for acting upon the surface of the material after it is laid by the spreader and during the reciprocation of said spreader.

30. In apparatus for laying plastic material, traveling mixer provided with means for actuating it to mix the material, a reciprocating spreader coextensive in width with the spread material connected with said mixer so that they may be moved independently with respect to each other and said spreader being reciprocated longitudinally over the spread material by said actuating means of the mixer, means for supplying the material from the mixer to the spreader, smoothing rolls connected with said spreader and acting upon the surface of the spread material under the reciprocating movement of the spreader, and a vertically adjustable scraper mounted on said spreader and acting upon the material as it is deposited thereby.

31. In apparatus for laying continuous stretches of plastic material on the surface to be covered, a traveling material mixer, a traveling spreader for laying the material across the longitudinal path of travel, said mixer and spreader being connected together but independently movable with respect to each other, means for moving the spreader towards the mixer while the latter remains at rest, means for moving the mixer away from the spreader while it remains at rest, and means for conveying material from the mixer to the spreader.

Signed at New York city, in the county of New York and State of New York, this 29th day of June A. D. 1921.

ALEXANDER CRAWFORD CHENOWETH.